US011153547B1

(12) United States Patent
Huai

(10) Patent No.: US 11,153,547 B1
(45) Date of Patent: Oct. 19, 2021

(54) CORRELATED ILLUMINANT ESTIMATIONS

(71) Applicant: Xiaoning Huai, Sunnyvale, CA (US)

(72) Inventor: Xiaoning Huai, Sunnyvale, CA (US)

(73) Assignee: Real Imaging Technology Co. Ltd, Shenzhen (CN)

( * ) Notice: Subject to any disclaimer, the term of this patent is extended or adjusted under 35 U.S.C. 154(b) by 0 days.

(21) Appl. No.: 17/151,166

(22) Filed: Jan. 17, 2021

Related U.S. Application Data

(63) Continuation of application No. 16/926,710, filed on Jul. 12, 2020, now Pat. No. 10,965,924, which is a continuation-in-part of application No. 14/691,804, filed on Apr. 21, 2015, now Pat. No. 9,565,410.

(60) Provisional application No. 62/097,262, filed on Dec. 29, 2014.

(30) Foreign Application Priority Data

Nov. 11, 2014 (CN) ............................ 201410630837
May 4, 2015 (CN) ............................ 201510230311

(51) Int. Cl.
*H04N 5/235* (2006.01)
*H04N 9/73* (2006.01)
*H04N 5/232* (2006.01)

(52) U.S. Cl.
CPC ............. *H04N 9/73* (2013.01); *H04N 5/2351* (2013.01); *H04N 5/2355* (2013.01); *H04N 5/23219* (2013.01); *H04N 5/23222* (2013.01)

(58) Field of Classification Search
CPC ... H04N 1/6086; H04N 5/2258; H04N 5/2351
USPC .................................. 348/223.1, 227.1, 366
See application file for complete search history.

(56) References Cited

U.S. PATENT DOCUMENTS

| 9,414,780 | B2 * | 8/2016 | Rhoads ................ G06F 16/245 |
| 2004/0189820 | A1 * | 9/2004 | Yagi ........................ H04N 9/735 348/223.1 |
| 2010/0149372 | A1 * | 6/2010 | Silverstein ............. H04N 13/15 348/223.1 |
| 2013/0083216 | A1 * | 4/2013 | Jiang ...................... H04N 9/735 348/223.1 |
| 2014/0063288 | A1 * | 3/2014 | Suh ........................ G01J 1/0414 348/229.1 |
| 2014/0211041 | A1 * | 7/2014 | McCrackin ............ H04N 5/353 348/223.1 |

* cited by examiner

*Primary Examiner* — Anthony J Daniels

(57) ABSTRACT

Disclosed is a method and apparatus of correlated illuminant estimation between different camera modules on a same electronic device. Example embodiments of automatic white balance of the digital image leveraging the illuminant estimation based on the facial color features are illustrated.

2 Claims, 11 Drawing Sheets

CORRELATED ILLUMINANT ESTIMATIONS

TECHNICAL FIELD

This invention involves color processing and control methods, systems, and devices of image and video media in electronic media devices.

BACKGROUND

Skin color surfaces are usually difficult in automatic white balance illuminant estimation. Firstly, skin tone could vary significantly from individuals to races; and secondly, it could be very close to and sometimes mingle with the white point locus under certain illuminations, which tends to illuminant estimation errors for some common illuminant estimation algorithms, such as A. The Grey World, B. Perfect Reflector and C. Color by Correlation Models. It is often found that even in top of the line professional or smartphone cameras automatic white balance errors and unpleasant skin tone rendition would occur, for example, by approaching the camera head to near skins. Therefore, in US patent application US2008037975 (A1), it is proposed to remove the detected face area as a noise from automatic white balance illuminant estimation.

Automatic white balance usually comprises steps of illuminant estimation and color gain adjustment followed by related color correction or enhancement. For illuminant estimation, it is a well-known classical phenomenon in automatic white balance that what comes into the camera lens is a mixed emission from surfaces with unknown reflectance spectrum properties illuminated by unknown ambient light sources. It would be much easier for automatic white balance if there is a reference color surface in the scene with known color properties such as a grey chart used for on-site white balance by professional photographers. However, that approach is cumbersome and not applicable to ordinary users for daily usage. Now it is observed that the face of a user of a Front-Side camera is often within the view field of the camera and comprises a considerable portion of the pictures taken, while back-side cameras and other consumer or surveillance digital cameras also take shots of human portraits more often than not. These findings and growing popularity of smartphones and other devices with Front-Side cameras make it a practical application for automatic white balance and related color rendition to use a reference surface within the image target itself, the properly characterized facial color features of the device user.

SUMMARY OF THE INVENTION

The first intent of this disclosure is to provide an automatic white balance method for automatic white balance control in an electronic media device, comprising acquiring The Facial Color Features Set of a user or users and conducting automatic white balance illuminant estimation, gain adjustment and color enhancement based on the illuminant estimation results and the above acquired Facial Color Features Set of the user or users.

The second intent of this disclosure is to provide an electronic media device that incorporates the above method, with detailed description of its system architecture, components, and operations.

The third part of this disclosure is to provide a firmware or software based apparatus to realize the above said method.

Moreover, examples of preferred embodiments are described in detail to help the implementation.

BRIEF DISCUSSION OF DRAWINGS

DETAILED DESCRIPTION

Nomenclature $C_1$, $C_2$, $C_3$: Images are segmented to be comprised of facial parts (i.e. face area and its components) and background part (i.e. the image part that excludes the face area), and $C_1$, $C_2$, $C_3$ denote the color profiles of the illuminant estimation results with regard to background part, facial parts and the entire image respectively. The color profile of an estimated illuminant is represented by the coordinates in a color space or chromaticity coordinate system of a white point or a specific color surface. The algorithms used for illuminant estimation could be A, B, C methods described in the Background Section or other methods.

Facial Color Features Set: For automatic white balance and color adjustments methods and apparatus disclosed hereby, Facial Color Features denote the acquired results of color profiles of three components of a segmented human face: the facial skin tone area, the eyeball white and the teeth. Facial Color Features Set comprise the Intrinsic Values set and Target Values set of above mentioned three major components under illumination by illuminants of a range of color profiles of one or more users. The color profile comprises coordinates in a color space or chromaticity coordinate system.

Figure 1:
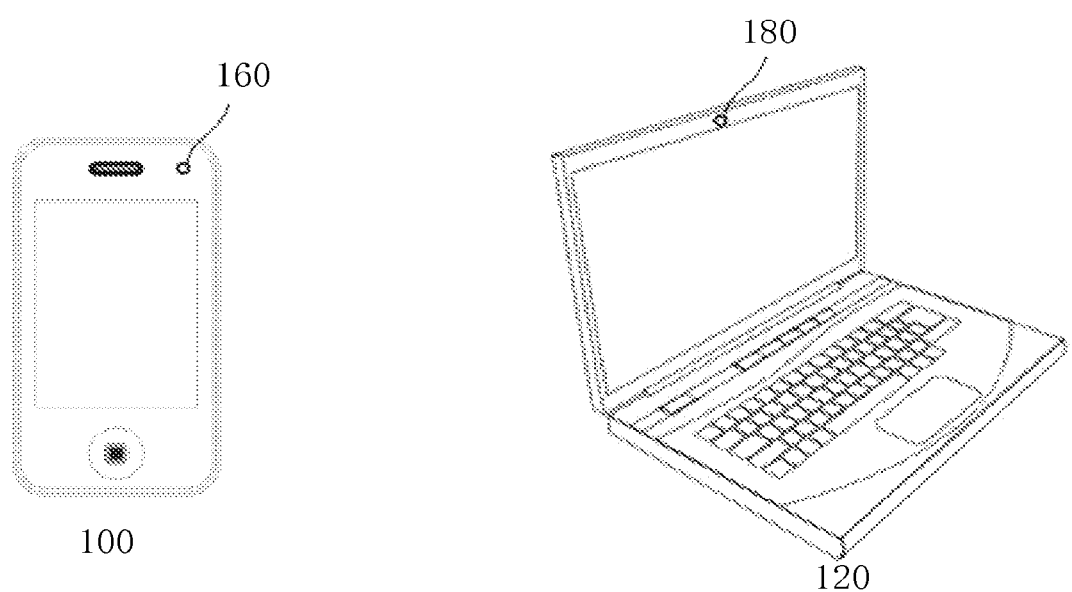
FIG. 1 is an illustration of the front camera platforms.

Front-Side Camera Platform: Refers to camera devices and other electronic media devices that have at least one camera configured such that its field of view usually comprises the image of a user or users of the electronic media device as a front-side operational mode, as in FIG. 1, 100 a smartphone, 120 a notebook, 160 and 180 a built-in Front-side camera.

OWNER: The actual owner or the administrator of the electronic media device or devices defined in this application, who has the privilege to use and grant others the privilege of the USER STATUS to use the invented methods in this disclosure. If the face of a person detected is not recognized to have the USER STATUS, it will not appreciate the benefit of this application.

User: A person who has USER STATUS. The USER STATUS can also be granted to a person automatically by the service routines of the electronic media device or devices defined in this application, and the size of user group could be dynamically expanded up to the system resources and efficacy limits.

ISP: An image and signal processing system in an electronic imaging device such as a camera, usually comprising interfaces to image sensor and host controller, an electronic circuitry pipeline and other computational logic circuitry hardware engines for pixel level processing, memory modules, a programmable controller and firmware for image processing and system control processes.

An electronic media device of a Front-Side Camera Platform comprises one or more cameras, with at least one camera is configured such that its field of view usually comprises the image of a user or users of the electronic media device as a front-side operational mode; one or more processors with one working as the System Controller controlling system operation of the device; non-transitory storage media containing instructions readable by System Controller and the one or more processors; memory storage media module accessible by the camera or the cameras to store captured and processed images and other data, and by the one or more processors to execute the controlling instructions; an apparatus with mechanisms to receive and send images, videos and other data; a display device being able to display images, videos and graphics content; a user controllable interactive interface to the electronic media device that displays image or graphics content on the display device and takes in the user control input by touching, keying, voice, or other remote sensing mechanisms and interprets the user input so that the System Controller understands the user's intention and properly process it.

Figure 2:
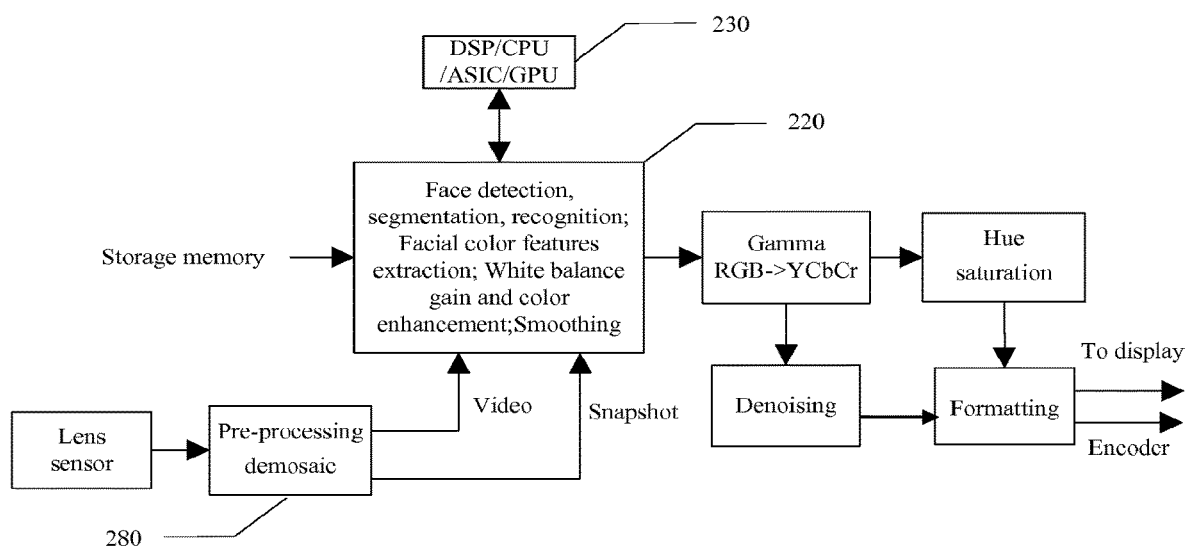
FIG. 2 is a block diagram of an example of image processing pipeline including the automatic white balance and related color processing units.
Figure 3:
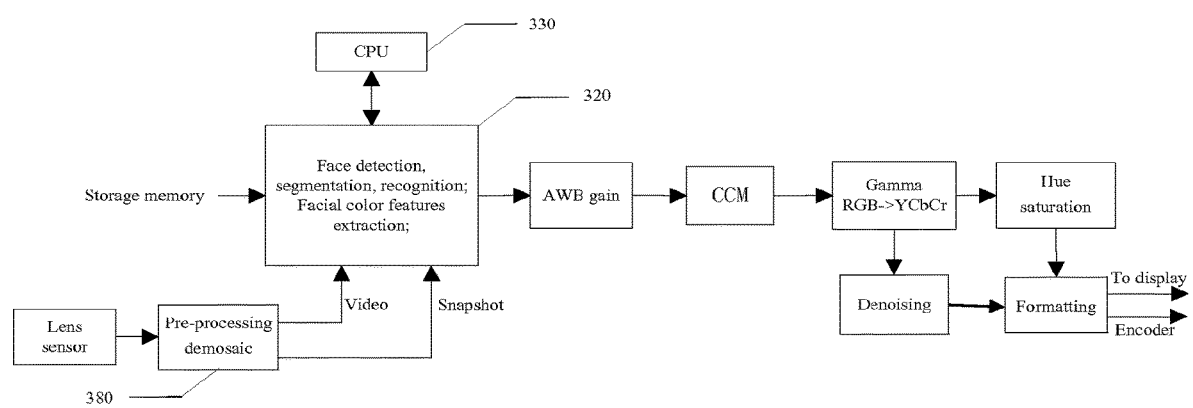
FIG. 3 is a block diagram of another example of image processing pipeline including the automatic white balance and related color processing units.

The camera in front-side operational mode comprises a lens, an image sensor, an ISP system, an interface logic circuitry between the sensor and the ISP system, a programmable camera controller, which could be a dedicated camera processor or shared by the host processor or one of the host processors, a display device or shared host display device, a native storage memory or shared storage memory with the host device for ISP operations, and an image and video output modules orchestrated by the host device. The camera has power off, power on, standby, preview, and video or still capture mode among others, controlled by the System Controller or a dedicated camera controller upon a host request of the System Controller in response to the user input. In preview or capture mode, image frames from an image sensor are acquired via an interface circuitry and pre-processed in the ISP pipeline and stored in a memory storage after demosaic stage, where face detection, segmentation and recognition and Facial Color Features based automatic white balance is carried out by one or more programmable computing devices and logic circuitry engines coupled to the memory storage and ISP pipeline. The processed image is sent to the coupled ISP downstream pipeline for further processing to generate formatted outputs respective to an application specific standard, to be displayed on a display device of the host media device, stored in a local nonvolatile storage media or sent out by a networking media after encoding and other further processing. Simplified examples of schematics for an ISP of a camera are illustrated in FIG. 2 and FIG. 3.

Figure 4:
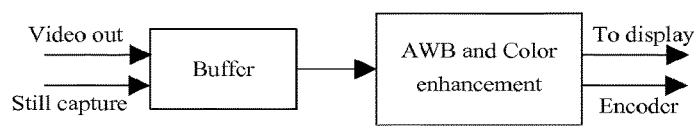
FIG. 4 is a block diagram for post processing method.

Automatic white balance control apparatus as part of the camera ISP comprises illuminant estimation and gain adjustment of the image color so that image will appear like under an ambient illumination by an illuminant with a standard color profile such as D50 for example, or the image color is adjusted to a popularly favored color target more pleasing to human perception, or to the preferred target condition defined by an individual user of the device. Additional color correction and enhancement are carried out after or together with the automatic white balance gain adjustment. The automatic white balance control apparatus could be implemented real time inside the ISP block as illustrated in FIG. 2 and FIG. 3, or in a different location of ISP pipeline such as in Bayer domain or as a post processing apparatus on the same device platform as illustrated in FIG. 4, or as an off-line application in a different device. As in an example embodiment schematics is illustrated in FIG. 2. Image or frames of video streams are acquired, pre-processed and stored in a storage memory 260. The computational resources 230 read data from and write back to buffer 260 to conduct face detection, recognition, Facial Color Features extraction, illuminant estimation, white balance gain adjustment, color correction and enhancement. Sufficient memory size and parallel processing are preferred for continuous operation with good image quality and reduced latency in video streaming and image capture.

Figure 5:
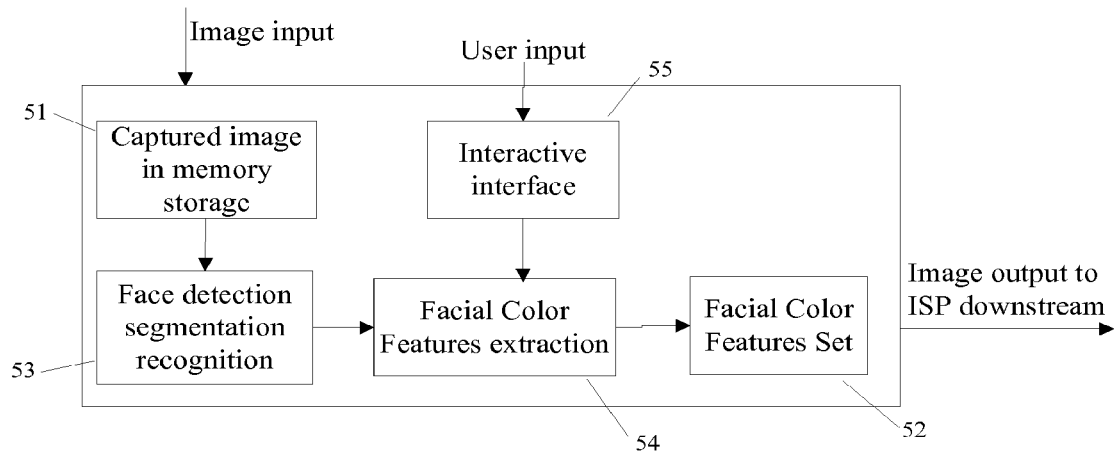
FIG. 5 is a block diagram for the Facial Color Features Acquisition Mode.
Figure 6:
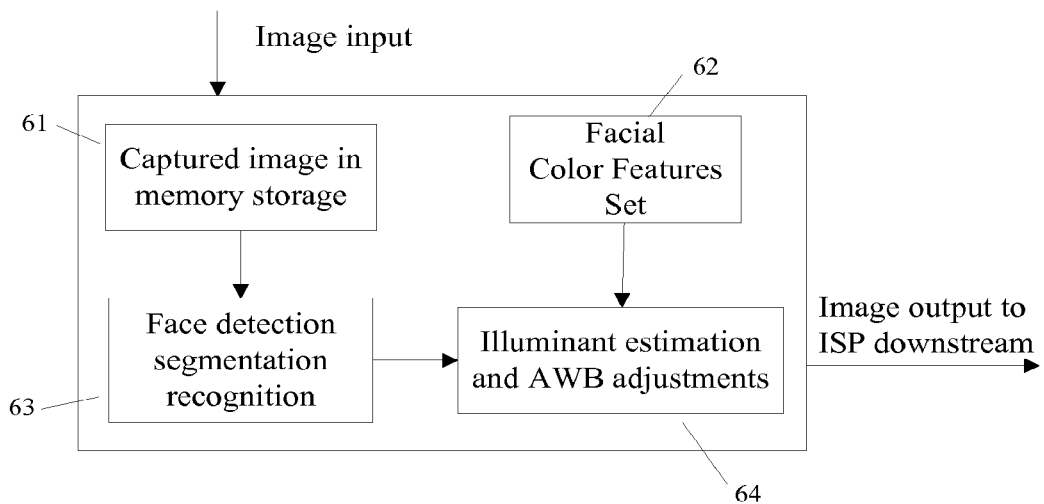
FIG. 6 is a block diagram for the Automatic White Balance Adjustment Mode.
Figure 7:
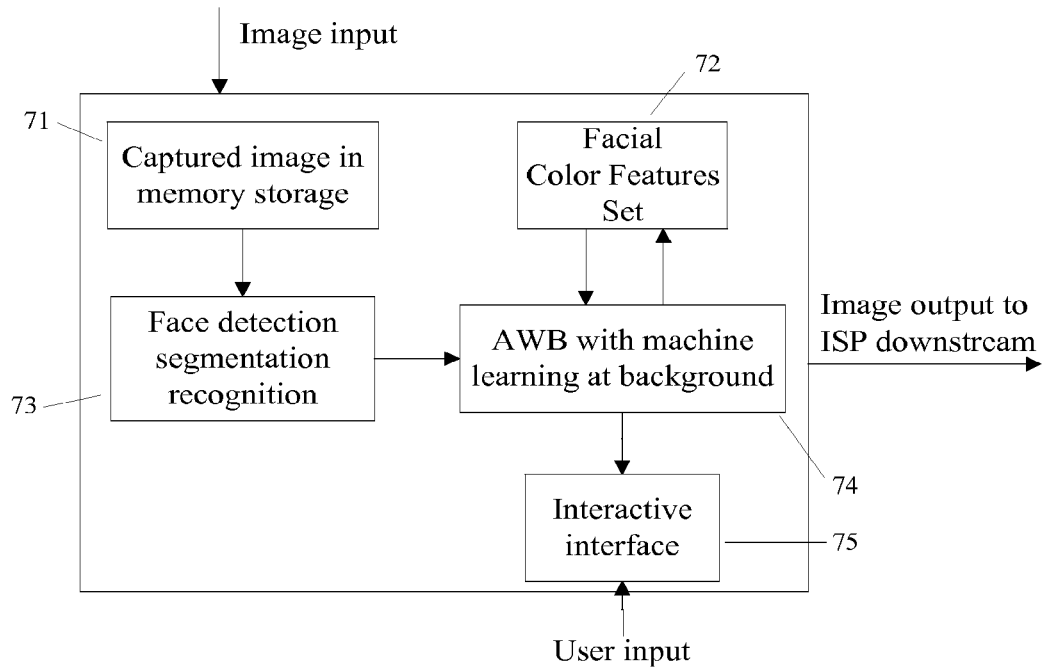
FIG. 7 is a block diagram for Automatic White Balance with Machine Learning Mode.

The automatic white balance control apparatus described herein has three operational modes: The Facial Color Features Acquisition Mode as illustrated in FIG. 5; The Automatic White Balance Adjustment Mode as illustrated in FIG. 6; and The Automatic White Balance with Machine Learning Mode as illustrated in FIG. 7.

In the Facial Color Features Acquisition Mode, Module 53 conducts face detection, segmentation and recognition of a pre-processed captured image in an image storage buffer 51; Module 52 acquires Intrinsic Values of the Facial Color Features for each recognized user by methods detailed later, and acquires Target Values of the Facial Color Features as user favored rendition based on user inputs via an Interactive Interface module 55 and stored the results in module 54 The Facial Color Features Set.

In the Automatic White Balance Adjustment Mode, Module 63 conducts face detection, segmentation and recognition of a pre-processed captured image in an image storage buffer 61. Module 64 takes the result of module 63 and the stored Facial Color Features data from 62 The Facial Color Features Set to conduct illuminant estimation to get $C_1$, $C_2$ and $C_3$, and then conducts white balance and color enhancement based on $C_1$, $C_2$, $C_3$ and the user data in The Facial Color Features Set in 62.

In Automatic White Balance with Machine Learning Mode, automatic white balance control initially is based on $C_1$ and the Facial Color Features Acquisition by Machine Learning is carried out at the background, as the camera operates in normal conditions. Once the learning converges and Facial Color Features data are acquired, a similar operation to the Automatic White Balance Adjustment Mode described above is carried out.

The Facial Color Features Acquisition Mode

Below is a detailed description of The Facial Color Features Acquisition Mode as illustrated in FIG. 5.

Figure 8:
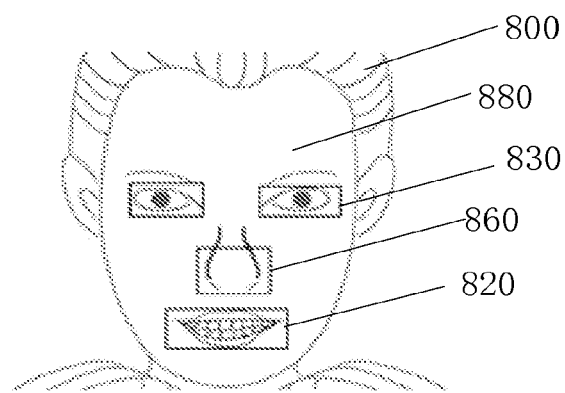
FIG. 8 is a segmentation of face into three parts: face skin, eye ball white, and teeth.

Face detection and recognition have been running on smartphones and other electronic media devices in real time. The computational complexity for face recognition could be even more reduced to the level of user identification in the context of applications concerned in this disclosure, due to the availability of a variety of identity info in the electronic media devices such as password, finger prints and other sensing data or secured device access protocols, the availability of Facial Color Features as a complementary or independent identity feature set to be obtained by methods detailed later in this disclosure, and limited size of user group on the Front-Side Camera Platform, which in an extreme yet quite common case is just the OWNER alone for devices like mobile phones or personal computers. Therefore, general methods for implementation of face detection, segmentation and recognition are considered to be a prior art without the need for elaborations herein. An example results of detected, segmented and recognized face is illustrated in FIG. 8.

Set the camera of the Front-Side Camera Platform to the facial color feature Lab Calibration Mode, and use an ambient light source with a standard reference color profile such as D50 or D55 to illuminate a standard grey chart within the proper depth of field; adjust exposure by automatic exposure of manually; adjust white balance by automatic white balance or manually, so that the ratio of average R, G, and B values of a region of 60×60 pixels in the image center is 1:1:1 in the sRGB color space. Now turn off the automatic white balance function, and take a snapshot of the face of the user and make sure the image is clear and size of the face is large enough, such that the exposure of the face is proper and eye ball white and front teeth are clear and measurable as illustrated in FIG. 8. Then the facial color feature Calibration Service Routine conducts face detection and segmentation, resulting in 800 hair, 820 mouth, 830 eyes, 860 nose, and 880 face skin, which comprises the face area excluding the above named other parts. For automatic white balance and color enhancement, the skin color and is the most important item, while the eye ball white and teeth are also helpful, though may not be visible from time to time.

To extract skin color profiles, some pre-processing is needed to filter away noise components in the face such as hairs, nostrils and mustaches, and the pixels in skin area 880 and nose area 860 are converted from RGB to YCbCr space with a data structure to index back each pixel to its values in original RGB space. A first filter using luminance value Y as the threshold is run such that the dark pixels below a threshold are discarded, and qualified pixels form candidate pixel group one, of which a 2D histogram distribution in CbCr coordinate system is populated, and a second filter is run such that 70% pixels closest to the peak are selected as the qualified pixels and indexed back to their values in RGB space, where a simple average of qualified pixels in each of the R, G, B channels is computed to get what is defined herein the Intrinsic Values ($r_{110}$, $g_{110}$, $b_{110}$) of the face skin of the user, and input them to the relative position of the user entry in The Facial Color Features Set.

The processes to extract Intrinsic Values of eye ball white and teeth are similar, and the eye area 830 is further segmented to get the contours of the eye ball white region, while mouth area 820 is further segmented to get the contours of the teeth. Only pixels inside the contours are concerned further on. Then a similar filtering and calculation to the steps described in the previous paragraph are used to get Intrinsic Values of the eye ball white and the teeth as user entry data in The Facial Color Features Set.

Figure 14:
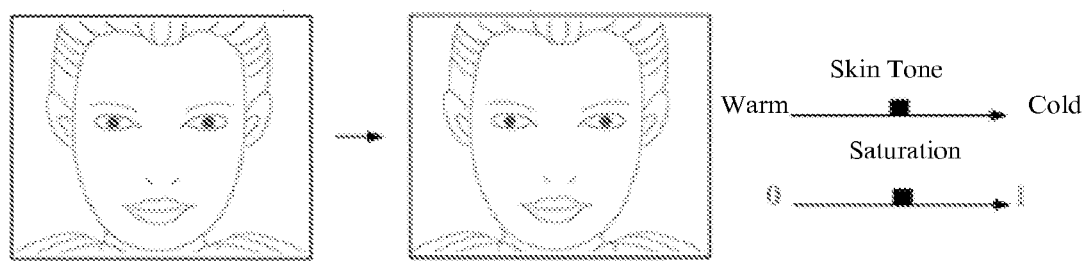
FIG. 14 is an illustration of user-platform interactive process.

Now that one set of Intrinsic Values of the Facial Color Features are acquired, the Facial Color Feature Calibration Routine proceeds to acquire the Target Value through an Interface Service Routine, which comprises displaying one or more enhanced color rendition of the facial parts (typically skin tone) of the captured image of the user or provide a color adjustment mechanism through a user-machine interface and gets the input from the user of the favored choice or adjustment. The adjustment of the face skin tone could be carried out by a transform in a color space with some statistically or empirically favored effects such as whitening, tanning, warming, and cooling etc. It also could be designed such that the user can use manual input, voice or other interactive methods freely control the hue, saturation and luminance of rendered image moving in a reasonable zone of a selective color space, and the corresponding rendered face picture is displayed as illustrated in FIG. 14. Based on the user input as a choice or adjustment or a combination thereof, the corresponding target is accepted and the facial color profiles are extracted and converted to the Target Values as a set of coordinates in RGB space and input into the Target Values position of the user entry in The Facial Color Features Set. Besides the coordinate representation of the Target Values, the transform functions corresponding to the user input as an operation to convert the captured image represented by the Intrinsic Values to the enhanced images represented by the Target Values is also recorded in the Target Value data structure in The Facial Color Features Set, so that the same or parameter adjusted transform could be used in the process of Automatic White Balance Adjustment Mode.

By changing the color profiles of the ambient illumination to cover sufficient range for automatic white balance applications and using similar procedures described above, a user entry in The Facial Color Features Set is complete and available to automatic white balance.

Due to the cost of lab condition set up and tedious procedures just described, an alternative acquisition process under Facial Color Features Measurement Mode is by the user taking snapshots of the front view of the face of the user together with a piece of standard grey chart or white surface material as a reference surface under a variety of common indoor and outdoor conditions, such as 'home incandescent light', 'office florescent light', 'sunny', 'cloudy', 'cloudy with sunshine', 'sunny with blue sky', 'sunrise', 'sunset' and etc. By measuring the a reference surface, the Measurement Service Routine detects color profiles of current illumination and the rest of the process to extract Facial Color Features is similar to what described under the Lab Calibration Mode.

An interpolation is usually needed during illuminant estimation when estimated illumination is in between calibrated data in The Facial Color Features Set. In one embodiment, The Facial Color Features acquired could go through a curve fitting procedure to generate continuous color temperature curves by a piecewise linear or nonlinear interpolation or extrapolation methods to cover sufficient color temperature range for real time illuminant estimation and automatic white balance adjustments. Take the skin tone as an example, by measuring related patches on Macbeth or other standard color charts representing skin tones or utilizing open source statistics, the skin tone distribution zone under a wide range of color temperature covered by a dotted envelop curve in (B/G,R/G) color coordinate system is illustrated in FIG. 9, wherein each user could find a trajectory of his or her skin tone Intrinsic Values, as well as that of Target Values, if the user did not intentionally give inputs to the Facial Color Features acquisition process as a special make up.

Figure 9:
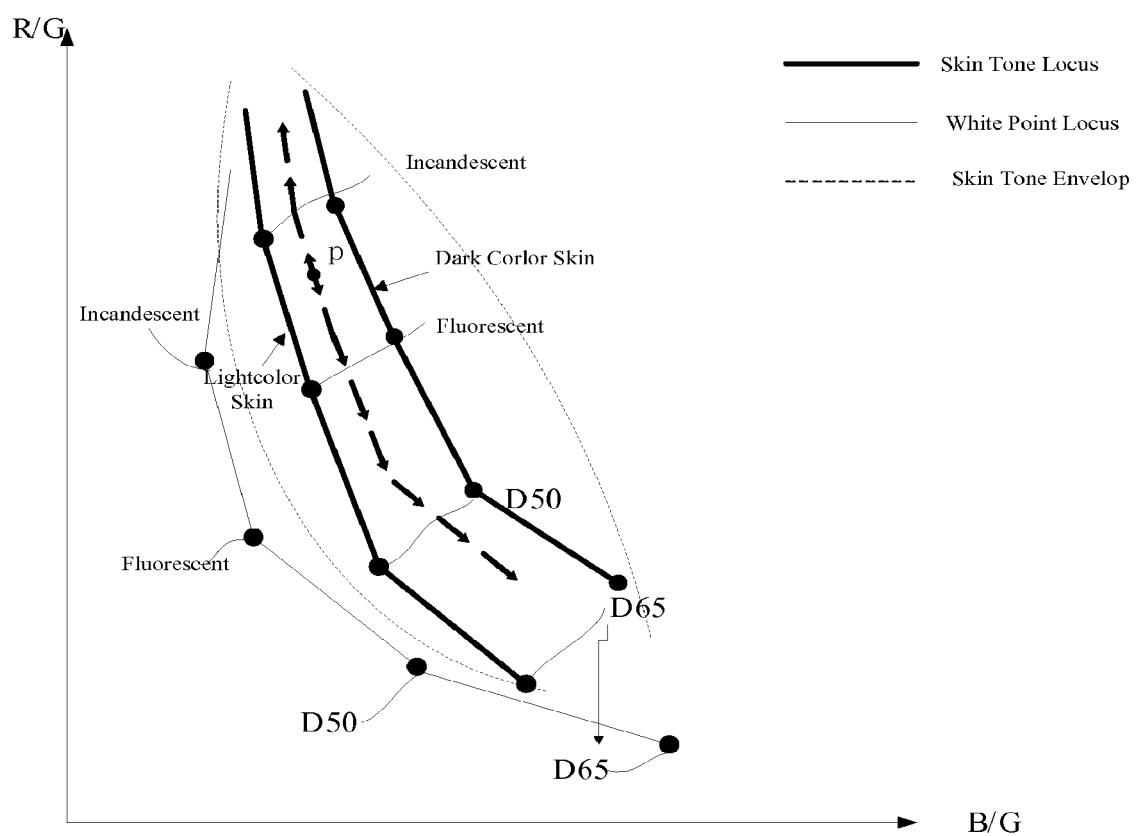
FIG. 9 is an illustration of the white surface locus and skin tone locus within a chromaticity coordinate system, the dotted line indicates possible expanding of the skin tone.

An Extrapolation Method to acquire the Intrinsic Values of the Facial Color Features is to get one point by previously described Lab Calibration Mode or Facial Color Features Measurement Mode procedures and do extrapolation to extend bi-directionally in line with the population trajectory of human skin and respective to the white point curve calibrated of the camera module of the device to cover the full color temperature range, as illustrated in FIG. 9., starting from a certain point P.

The above described Facial Color Features acquisition processes could be initiated whenever a new user is added to the user group or at a user's free will. For example, when the user's facial condition changes due to sickness, aging, and cosmetic make up, or when a different flavor of rendition has strong appeal to activate the desire.

The Automatic White Balance Adjustment Mode

Below is an example embodiment of how to use Facial Color Features in automatic white balance illuminant estimation in Automatic White Balance Adjustment Mode, based on a modified perfect reflector model in a (B/G,R/G) chromaticity coordinate system.

Figure 10:
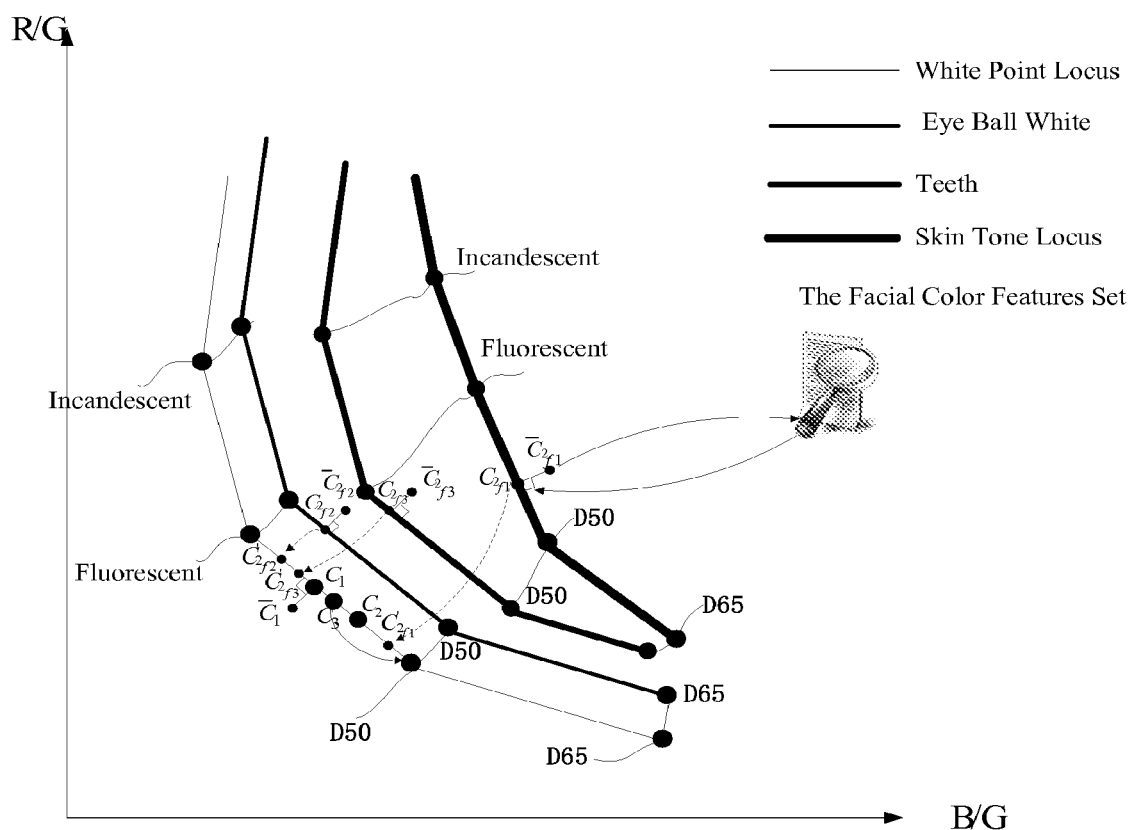
FIG. 10 is an illustration of a method to for illuminant estimation process, using $C_3$ to perform automatic white balance using one set of gain offsets unanimously to the entire image.

Refer to FIG. 10, for background illuminant estimation $C_1$, assume $i_b$ is a pixel in the image background part, and its R, G and B components are denoted by $r_{ib}$, $g_{ib}$, $b_{ib}$, the total number of pixels of image background portion is $T_1$, then an estimated averaged coordinates $$\overline{C}_1 = \left[\left(\sum_1^{T_1} \alpha_{ib} * \left(\frac{r_{ib}}{g_{ib}}\right)\right) \Big/ \left(\left(\sum_1^{T_1} \alpha_{ib}\right) * T_1\right)\right]; \tag{1}$$

$$\left(\sum_1^{T_1} \alpha_{ib} * \left(\frac{b_{ib}}{g_{ib}}\right)\right) \Big/ \left(\left(\sum_1^{T_1} \alpha_{ib}\right) * T_1\right)\right]$$

Where $\alpha_{ib}$ is a weighting coefficient, depending upon the luminance and the coordinates of $i_b$.

Project $\overline{C}_1$ to the nearest reference point in white point line, or a segment formed by the nearest two reference points in white point line, and find whichever junction point is closer to be $C_1$, as in FIG. 10.

The method to calculate $C_2$ is quite similar to that for $C_1$. Each facial part is regarded as an independent surface, assume $i_{fj}$ is a pixel on facial part and index j=1 for skin part, j=2 for eyeball white, and j=3 for teeth as the row number in the user entry in The Facial Color Features Set. The estimated averaged coordinate corresponding to skin part is $$\overline{C}_{2_{f1}} = \left[\left(\sum_{i=1}^{T_{2_{f1}}} \left(\frac{b_{i_{f1}}}{g_{i_{f1}}}\right) * \beta_{i_{f1}}\right) \Big/ \left(\sum_{i=1}^{T_{2_{f1}}} \beta_{i_{f1}} * T_{2_{f1}}\right), \right. \tag{2}$$

$$\left.\left(\sum_{i=1}^{T_{2_{f1}}} \left(\frac{r_{i_{f1}}}{g_{i_{f1}}}\right) * \beta_{i_{f1}}\right) \Big/ \left(\sum_{i=1}^{T_{2_{f1}}} \beta_{i_{f1}} * T_{2_{f1}}\right)\right],$$

where coefficient $\beta_{i_{f1}}$ is a weighting coefficient, depending upon the luma and the coordinates of $i_{f1}$, $T_{2_{f1}}$ is the total number of pixels of skin part.

Since each user has a set of Intrinsic Values of the face skin stored in an entry in The Facial Color Features Set, projecting $\overline{C}_{2_{f1}}$ to the nearest reference point in reference skin color line, or a segment formed by nearest two reference points in skin color line, selecting whichever junction point is closer to be $C_{2_{f1}}$;

The calculation for the rest of the facial part $C_{2_{f2}}$ and $C_{2_{f3}}$ is similar to that for $C_{2_{f1}}$.

As each point on its respective color temperature curve corresponding to an estimated color temperature of the canonical illuminant on the white point locus, $C_{2_{f1}}$, $C_{2_{f2}}$ and $C_{2_{f3}}$ are mapped to $C_{2_{f1}}'$, $C_{2_{f2}}'$ and $C_{2_{f3}}'$ respectively by a look-up table operation followed by a linear interpolation between neighboring reference points, and the overall estimation of the color temperature $C_2$, computed from the three facial parts is expressed as a weighted average sum of $C_{2_{f1}}'$, $C_{2_{f2}}'$ and $C_{2_{f3}}'$:

$$C_2 = \left(\sum_{j=1}^{3} C_{2_{fj}}' * \theta_j\right) \Big/ \sum_{j=1}^{3} \theta_j, \tag{3}$$

where $\theta_j$ is a confidence related weighted factor.

Taking $C_1$, $C_2$ as a vector, the overall estimate for entire image is expressed as $$C_3 = (C_1 * k_1 + C_2 * k_2)/(k_1 + k_2) \tag{4}$$

where, $k_1, k_2$ are weighting factors.

For some artificial light sources that differ from the black body radiance locus, and require color profile adjustment in addition to color temperature adjustment, $C_1 = \overline{C}_1$, which means no projection toward the white point locus is needed, and the same method applies to $C_2$ calculation.

With illuminant estimation done, there are a variety of options how to render automatic white balance and color enhancement, particularly over the facial parts. There are trade-offs among color fidelity, effects of color enhancement, potential artifacts, user satisfaction and computational complexity. One simpler embodiment is to apply the same gain offset calculated with $C_3$ as the preferred illuminant estimation and a pre-defined color profile such as D50 or D55 as the standard target condition, using an image processing pipeline scheme as illustrated in FIG. 3, and the automatic white balance gain calculation is as follows:

It is assumed at the standard target illuminant condition, $$\frac{R}{G} = 1, \frac{B}{G} = 1$$

for a white surface. This is usually achieved in image pipeline calibration stage, a pre-set of gains are applied to match the color characteristics of a specific sensor and lens module, and front end image processing pipeline logic designs. Now that the estimated illuminant is $C_3$ with coordinates $$\left(\frac{B_1}{G}, \frac{R_1}{G}\right)$$

in (B/G,R/G) chromaticity coordinate system, the gain offsets applied to R and B color channels of each pixel of the image are just their reciprocals $G/R_1$ and $G/B_1$ respectively, while G gain is not changed to avoid deviations in luminance level.

After automatic white balance gain adjustment, color correction is carried out by a 3*3 CCM matrix with constant coefficients, expressed as $$[R',G',B']=A*[R,G,B]^T. \quad [5]$$

Figure 11:
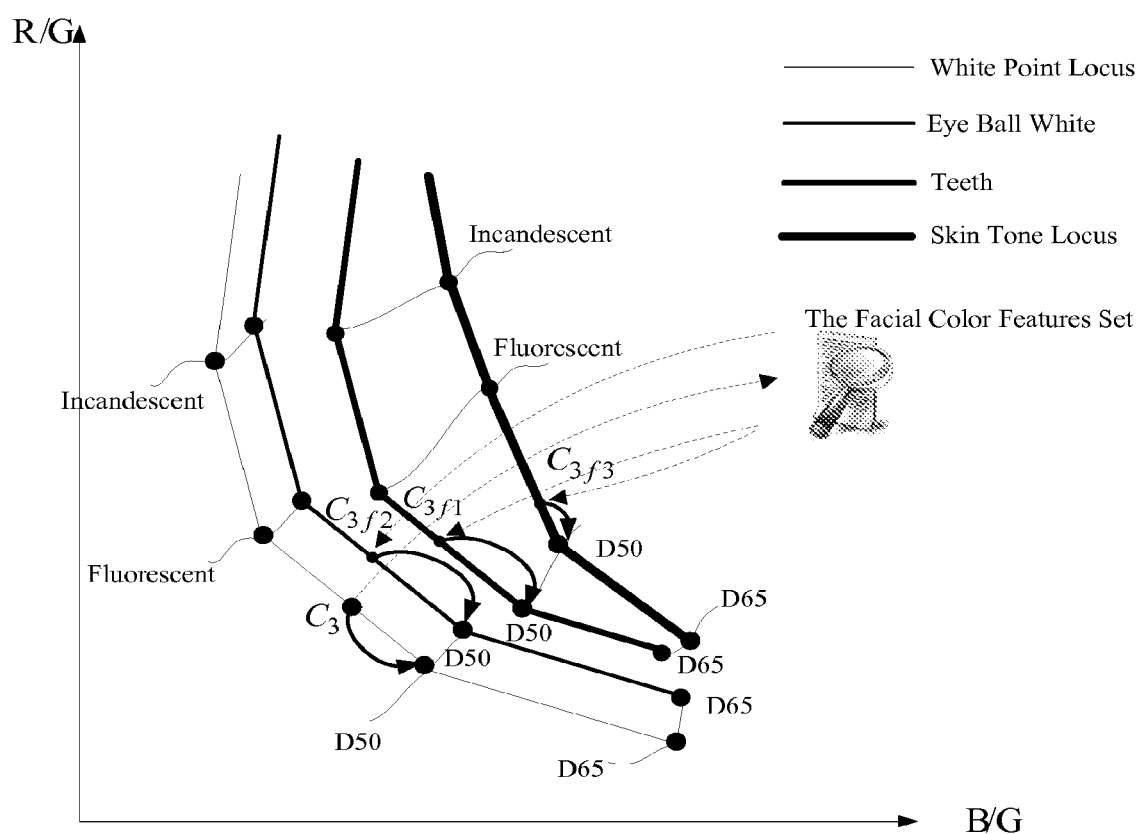
FIG. 11 illustrates a method using $C_3$ to perform distinctive automatic white balance gain adjustment s of facial parts and other background image to each respective standard reference target.

Another example embodiment of automatic white balance gain and color enhancement is illustrated in FIG. 11, where instead of a unified gain adjustment toward a standard target D50 on white point locus, each of the facial parts is adjusted from mapped $C_3$ position to D50 position on its own color temperature curve as fitted from the Intrinsic Values of the Facial Color Features in The Facial Color Features Set. Accordingly, a similar gain calculation to the unified method is carried out and applied respectively to pixel areas of face skin, eye ball white, teeth, and other background areas of the image. This approach has better color rendition for facial parts and computational complexity is also higher.

Figure 12:
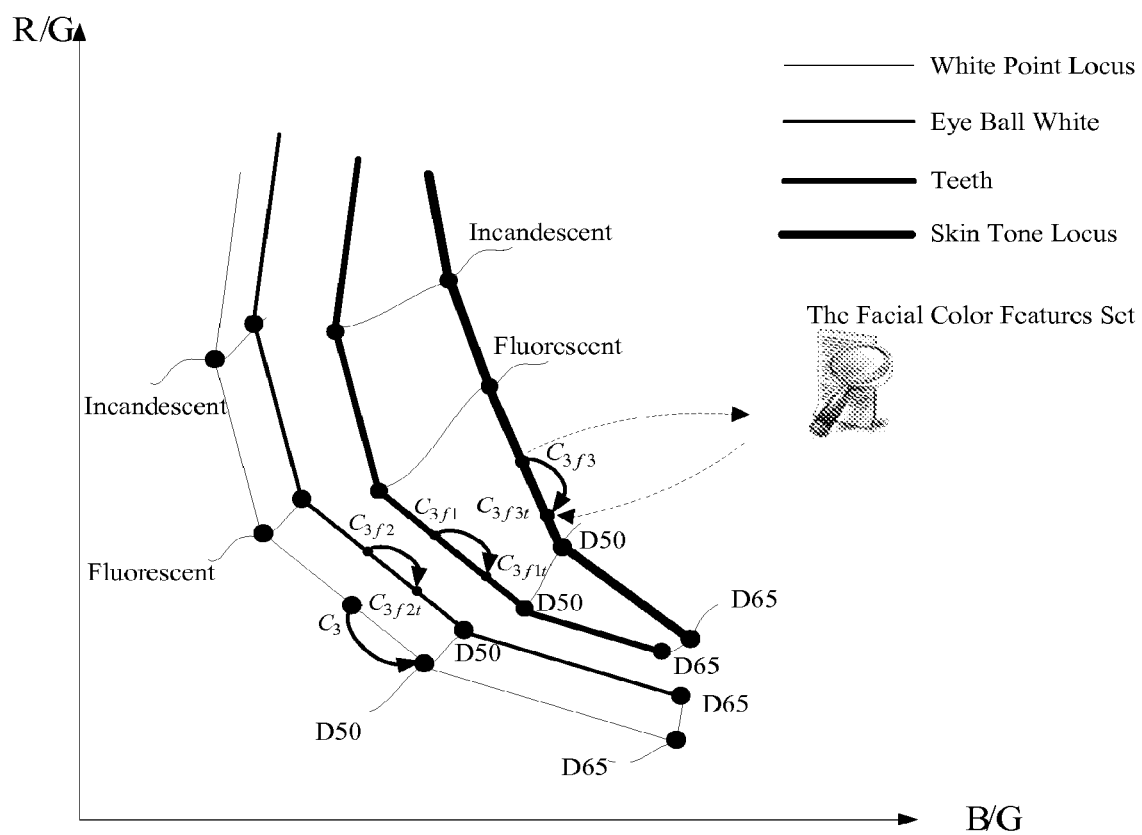
FIG. 12 illustrates a method using $C_3$ to perform distinctive automatic white balance gain adjustment s of facial parts and other background image taking user inputs as reference targets.

A third embodiment of automatic white balance adjustments is illustrated in FIG. 12, wherein the facial parts are adjusted from their current position in their own color temperature curve corresponding to $C_3$ to a user preferred target position defined as Target Values in The Facial Color Features Set. As in the process to acquire The Facial Color Features Set, each set of Intrinsic Values data are mapped to a set of Target Values data by a transform function corresponding to a choice or adjustment from the user input. In case of missing the input choice from a user, the Target Values take as default Target Values a standard reference Intrinsic Values position from the user entry in The Facial Color Features Set or experimentally and popularly favored reference color profiles.

A preferred embodiment for automatic white balance adjustments is by adjusting the facial parts and other detected skin area of a user from under current illuminant estimation $C_2$ to the user preferred target position defined as the Target Values in the user entry of The Facial Color Features Set, and color of the rest of the image from under current illuminant estimation $C_1$ to under a standard reference illumination position. This method is particularly applicable where the illuminations of the face and the background are from illuminants with quite different color profiles. One solution is to use the original transform function during the process of facial color features acquisition with optimized parameters tuning gearing to the illuminant estimation results, wherein an interpolation is needed between two or more characterized intrinsic values in The Facial Color Features Set to determine the proper parameters for transform function to get to the proper Target Values.

An alternative solution is described below, considering the face skin tone first:

Assuming $B_{current}$ and $G_{current}$ to be the estimated skin tone under current illuminant estimation $C_2$, and $R_{ref}$, $B_{ref}$ and $G_{ref}$ to be current Target Values for face skin corresponding to $C_2$, calculate $$R\_gain = \frac{R_{ref}}{R_{current}}; B\_gain = \frac{B_{ref}}{B_{current}}; G\_gain = \frac{G_{ref}}{G_{current}}, \quad [6]$$

and multiply the R, G, and B components of each pixels of the facial skin by R_gain, B_gain and G_gain respectively. In case the difference between $G_{ref}$ and $G_{current}$ is bigger than a threshold, to avoid luminance level fluctuation artifacts in the facial boundaries, convert the pixels in the face skin area to HSL color space, wherein adjust the color saturation and hue of the pixels to the desired Target Values, without changing L, by a procedure detailed below:

Assuming current illuminant estimation and the Target Value in HSL color space to be $(H_{current}, S_{current}, L_{current})$ and $(H_{ref}, S_{ref}, L_{ref})$ respectively, calculate the $\Delta H=H_{ref}-H_{current}$; $\Delta S=S_{ref}-S_{current}$, and for each pixel $(h_{current0}, s_{current0}, l_{current0})$, the adjustment is by the below formulas;

$$h_{current1}=h_{current0}+\gamma*\Delta H; \quad [7]$$

$$s_{current1}=s_{current0}+\theta*\Delta S; \quad [8]$$

where, $\gamma$ and $\theta$ are luminance and color dependent factors, and each adjusted pixel $(h_{current1}, s_{current1}, l_{current0})$ is converted back to RGB color space.

Figure 13:
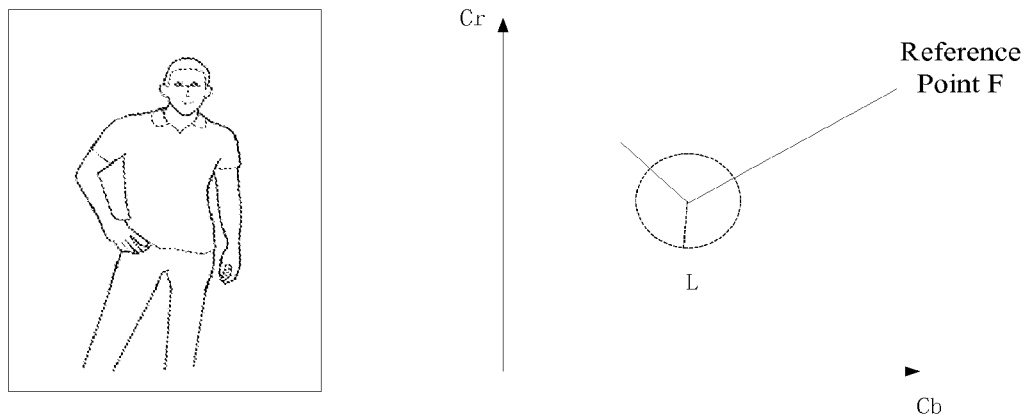
FIG. 13 illustrates a method to detect and process other naked skin area than face.

To render a consistent skin tone for face and other naked skin parts of the user, it is necessary to estimate where and how large are the naked skin areas other than the face. Naturally, neck is connected to head and face. Based on the geometry measure of the size proportion and orientation of the detected face in the image, a projection is made of a rectangle image area that might contain the whole body and limbs of the user as illustrated in FIG. 13. Then further detection and segmentation procedure leads to identifying the contour of the body and limbs. Then the image pixels inside the contour are converted from RGB color space to YCbCr space, wherein take the current estimated face color coordinates f as the center, populate a 2D histogram in CbCr chromaticity coordinate system, and use a rectangle or circle with adjustable dimension as a first stage filter. For pixels inside the area, further filtering is carried out to determine a skin pixel by a second classifier using features such as morphological measurements, the coherence and connectivity of neighboring pixels or pixel clusters and luminance values. Skin pixels are processed using the same way as those for the face skin, and other facial parts such as eye ball white and teeth, depending upon the confidence level in estimation of their positions, clarity and colors, could be adjusted from their current Intrinsic Values to the Target Values, using similar calculation scheme as above for skin tone, or are treated the same way as the background. Since the skin tone and other facial areas are processed differently from the other parts of the image, boundary smoothing is carried out after color adjustments.

There are more implementation methods for color adjustments based on a variety of combinations of $C_1$, $C_2$ and $C_3$ that could be tailored to different favors, wherein the enumeration of the implementations for each combination is not necessary since it is not difficult to infer the steps to carry them out by ordinary individuals of the skill in this field, within the framework of methods described above in this disclosure.

Automatic White Balance with Machine Learning Mode

The Automatic White Balance with Machine Learning Mode could be turned on by a user anytime or by the Learning Service Routine of the system automatically. The Learning Service Routine starts to run in background when the camera operates normally in preview, capture or playback mode wherein the camera acquires a digital image and store the image in an image buffer accessible by one or more processors. The Learning Service Routine running on the one or more processors start illuminant estimation by $C_1$ in an unsupervised learning mode, and if a certain illuminant estimation $C_{10}$ has a confidence level $w_1$ higher than a threshold $w_t$, the one or more processors conduct face detection, segmentation recognition of the buffered image, and in case of a face of a user being identified matching a user entry in The Facial Color Features Set locate the contours of the face skin, the eyeball white and the teeth areas, extract the Intrinsic Values data of the facial color features of the face skin, the eyeball white and the teeth by averaging qualified pixels after filtering using a first luminance threshold filter and a second histogram based color filter and store the Intrinsic Values data in a candidate buffer. If for the illuminant estimation $C_{10}$, the differences between the Intrinsic Values data stored in the candidate buffer are smaller than a threshold with a repetitive appearance probability $P_1$ bigger than a threshold $P_{1t}$, the illuminant estimation $C_{10}$ is considered accurate, and an average of the Intrinsic Values data within the difference threshold stored in the candidate buffer is computed and added into the related Intrinsic Values position of the user entry in The Facial Color Features Set.

In a supervised learning mode, the one or more processors proceed to display on a display device an image after automatic white balance adjustments adjusting the image color under current illumination estimated by $C_{10}$ to under a standard reference illumination or a popularly perceptually favored illumination condition followed by a color correction, and use a user-machine interactive interface to prompt for and acquire user's opinion about the color rendition. If the user confirms the color is satisfactory, the Intrinsic Values of the user under the estimated illumination $C_{10}$ is extracted using the same procedure described in the unsupervised learning mode and added to the related Intrinsic Values position of the user entry in The Facial Color Features Set.

In a combinational mode, after the accuracy of an illuminant estimation $C_{10}$ passing through the statistical criteria in the unsupervised learning mode, a further evaluation using the same procedure described in the supervised learning mode is carried out before the illuminant estimation $C_{10}$ is confirmed and related Intrinsic Values data are added to The Facial Color Features Set.

The Target Values data are acquired in the supervised learning mode by displaying enhanced images over or provide a mechanism to adjust the captured image under the illumination estimated by $C_{10}$, or a combination thereof, and prompting for and acquiring the input from the user. The Target Values of the facial color features are extracted based on the input by the user using the same procedure described in the unsupervised learning mode, and added together with the transform functions corresponding to operations on captured image based on user input to the related position of the user entry in The Facial Color Features Set.

The short term learning process is complete after the acquired data in the user entry of The Facial Color Features Set cover sufficient range of color profiles as needed for automatic white balance, and illuminant estimation and automatic white balance adjustments could be carried out using the acquired data in The Facial Color Features Set.

Figure 15:
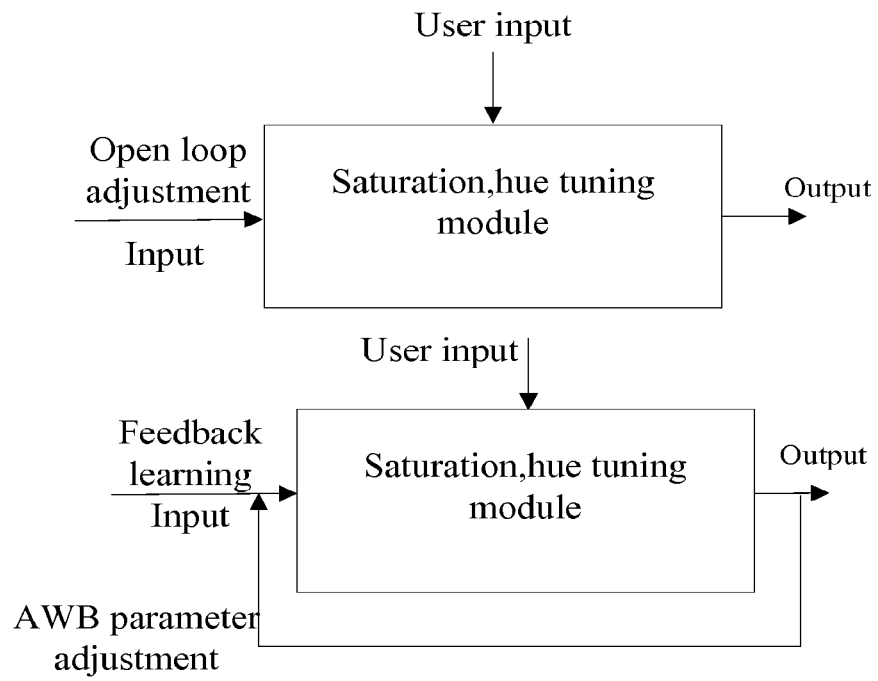
FIG. 15 is an illustration of feedback learning automatic white balance improvement.

Machine learning could continue even after it meets short term convergence criteria, and the user can turn it on and off through an interactive interface to the device. This is useful when the facial color profiles change due to aging, sickness, emotions or cosmetic make ups, or to satisfy the desire of a user for an intentional special color effect as the Target Values. The user feedback mechanism as described hereby could also be used to affect the weighting schemes, the threshold parameters in the micro-architecture of automatic white balance control apparatus, and for example, the parameters in the transform function to convert the Intrinsic Values to the Target Values. A simple flow chart is illustrated in FIG. 15.

Although the above described preferred embodiments are focused on automatic white balance for the Front-Side Camera Platform, the automatic white balance methods and apparatus described herein are applicable to other type of electronic media devices as well. For example, it is common the back side camera of a mobile phones or a digital camera has a Set Timer Mode for taking shots of self-portrait. Another example is the back-side camera or a digital camera can use a user's face as a reference for automatic white balance if the user's face is in the view and the facial color profile of the user has been acquired in a accessible The Facial Color Features Set. Moreover, the device accommodates an integrated and a distributed implementation schemes, wherein the integrated implementation scheme accomplishes the method in one single device of a Front Side Camera Platform, while the distributed implementation scheme accomplishes the method by more than one devices with at least one device having at least a camera having a front-side operational mode, wherein for example, the image or images captured by a first front-side camera device could be sent to a second separate or deferent type of device to be processed to extract The Facial Color Features Set, and the acquired Facial Color Features Set could be used by the second device or sent back to the first device or a third separate or deferent type of device to conduct illuminant estimation and white balance adjustments. The automatic white balance method in this disclosure could also be accomplished by software in one or mode devices receiving images not in real time using the methods described above. Except for image capture requiring a camera, other devices may or may not have a camera, including for example TV set, display devices, game devices, computers, image or video compression or encoding devices and network transmission devices.

While in a preferred embodiment described in FIG. 2, the frame buffer memory storage and related automatic white balance processing is carried out by computational resources in RGB space, it could also be implemented in Bayer domain or in a distributed scheme within the ISP, or as a post-processing block as illustrated in FIG. 4, or offline in a different image media device.

In most of the generic ISP of camera devices, the automatic white balance control apparatus comprise electronic digital circuitry based pixel computation (i.e. hardware) for pixel color statistics collection engine, gain offset, CCM multipliers and more in the ISP pipeline, while programmable processor or DSP device based (i.e. firmware) computation are responsible for illuminant estimation, gain offset calculation, other computational services and overall process control. To accomplish the tasks of face detection, segmentation and recognition and the automatic white balance methods described in this disclosure requires proper arrangement of the resources. The more dedicated computing resources, and the faster processors or DSPs, the faster processing speed, better image quality and less latency, but the cost and power consumption are also higher. The computational complexity could increase significantly if there are more than one users in the view as in a Multiple User Mode. In that case, one option is to prioritize the user entries in The Facial Color Features Set and add a Priority Index Field in the data structure of The Facial Color Features Set, and conduct automatic white balance with higher priority in favor of the user entries with higher priority ranks. The OWNER or the user could also select a Multiple User Mode or Single User Mode to avoid the conflict. Taking a mobile phone device for example, the OWNER usually is the only user and naturally would like that he or she to be best expressed in the image so as to his or her own satisfaction by selecting a Single User Mode. On occasion such as taking a shot of family gathering, it would please all if each member is satisfied, and Multiple User Mode could be selected with the same priority rank allover, which would lead to a multiple user concurrent processing. Obviously, it would take more resources, power and time to finish the automatic white balance than for a single user. So there is a trade-off between performance and cost, as it could be seen from the flow chart in FIG. 2 and FIG. 3.

However, as it is indicated earlier, both face detection and recognition have been running on imaging devices such as cameras of some mobile phones, accomplishing the increased computational load as a result of the automatic white balance methods described in this disclosure should be feasible, and particularly for the example embodiment using $C_3$ to apply unified gain offset to the entire image. As an expedite implementation, firmware based realization of automatic white balance methods disclosed herein for still image capture is doable only at the cost of some additional latencies.

The illuminant estimation by the front-side camera could be useful to automatic white balance for the back-side camera, when it works in a slave mode. The back-side camera can issue a system request to the System Controller for the front-side camera to assist its illuminant estimation. The System Controller endorses if there is no conflict in system resource and the front-side camera and back-side work concurrently. The front-side camera conducts illuminant estimation and outputs the illuminant estimation results to the back-side camera and the back-side camera uses the illuminant estimation results by the front-side camera as a reference for final illuminant estimation by the back-side camera. A rudimentary support for the correlated illuminant estimations comes from an observation that since both cameras are working at the same time, at the same spot and on the same device, the illuminants for scenes of two different angles as viewed by the two different cameras could have a chance to be correlated. This operational mode will benefit situations where the confidence level for the illumination of the back-side camera is low, and the illumination of both cameras are the same or correlated, including the following conditions for example: The fields of view of both cameras are both indoor or outdoor; The distance of fields of view of both cameras is close; The color profile of light source detected by the front-side camera is the same or close to the illuminant estimation by the back-side camera, and the illuminant estimation of both cameras are the same or close. The back-side camera and front-side could work concurrently as a normal operation mode or intermittently on a per need basis. When the user is not operating the front-side camera, the front-side camera does not have to conduct automatic white balance gain adjustment and other down-stream ISP processing to reduce power consumption. Similarly, the front-side camera could also make use of the illuminant estimation by the back-side camera to assist its illuminant estimation, and a similar correlation could be established between any two cameras on the same device.

Figure 16:
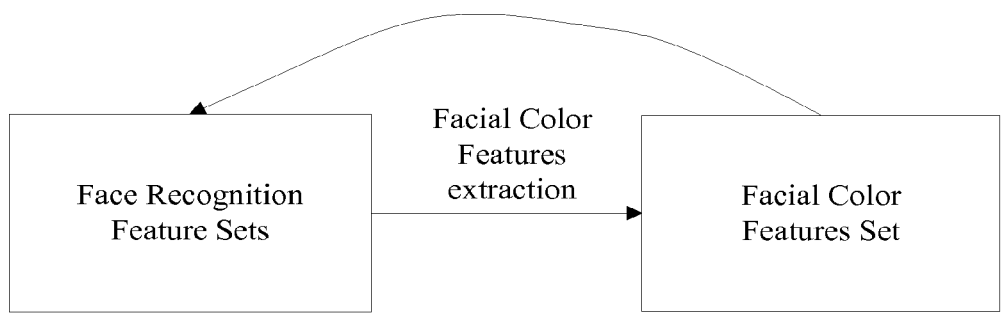
FIG. 16 is an illustration of Facial Color Features used as complimentary vectors for face recognition.

The Intrinsic Values of The Facial Color Features Set acquired could serve as a complementary or an independent feature Set for face recognition and be fed back into the face recognition module of the platform as illustrated in FIG. 16, and it is also usable in other face recognition related applications, such as video surveillance and internet image and video searching.

While ordinary professional of the skill in this field should be able to come up with a variety of practical implementation schemes tailored to the different embodiments of the automatic white balance methods and framework disclosed hereby, it is the intention of the applicant that the following claims include all modifications and alterations that they come within the scope of the following claims or the equivalents thereof.

The invention claimed is:

1. An apparatus, comprising:
a first camera mounted on a first side of an electronic device conducting a first illuminant estimation of a first digital image acquired by the first camera; and
a second camera mounted on a side opposite to the first side of the electronic device conducting a second illuminant estimation of a second digital image acquired by the second camera if a confidence level of the first illuminant estimation by the first camera is below a threshold,
wherein the first camera or the second camera conducts a third illuminant estimation based on the first illuminant estimation and the second illuminant estimation.

2. The apparatus of claim 1, wherein the first camera or the second camera conducts a color correction or enhancement of a digital image acquired by the first camera or the second camera based on the third illuminant estimation.

* * * * *